US011275534B2

(12) United States Patent
Sakurai

(10) Patent No.: US 11,275,534 B2
(45) Date of Patent: Mar. 15, 2022

(54) IMAGE FORMING DEVICE

(71) Applicant: KONICA MINOLTA, INC., Tokyo (JP)

(72) Inventor: Masato Sakurai, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/202,712

(22) Filed: Mar. 16, 2021

(65) Prior Publication Data
US 2021/0326084 A1 Oct. 21, 2021

(30) Foreign Application Priority Data

Apr. 15, 2020 (JP) .............................. JP2020-072724

(51) Int. Cl.
*G06F 3/12* (2006.01)
(52) U.S. Cl.
CPC .......... *G06F 3/1208* (2013.01); *G06F 3/1251* (2013.01)
(58) Field of Classification Search
CPC .............................. G06F 3/1208; G06F 3/1251
USPC ....................................................... 358/1.18
See application file for complete search history.

(56) References Cited

U.S. PATENT DOCUMENTS

| 8,270,737 B2 | 9/2012 | Kurigata | |
| 2010/0060938 A1* | 3/2010 | Kondoh | H04N 1/506 358/3.13 |
| 2016/0034230 A1* | 2/2016 | Hori | G06K 15/189 358/1.12 |
| 2016/0034231 A1* | 2/2016 | Miyake | G06K 15/4095 358/3.28 |
| 2018/0081604 A1* | 3/2018 | Shirasaka | G06K 15/404 |

FOREIGN PATENT DOCUMENTS

JP           2009141544 A     6/2009

* cited by examiner

*Primary Examiner* — Allen H Nguyen
(74) *Attorney, Agent, or Firm* — Holtz, Holtz & Volek PC

(57) ABSTRACT

An image forming device forms images of a plurality of pages on a continuous sheet, and the image forming device includes: a hardware processor that: stores the images to be formed on the sheet in a page unit; writes image data to be stored to the hardware processor from the images of the plurality of pages in the hardware processor as pieces of information on a plurality of pixels arrayed in a first direction and a second direction; reads the image data written in the hardware processor; and acquires a correction amount to correct a deviation between a conveying direction of conveying the sheet to an image former and the second direction of the image data; and the image former that forms the images on the sheet based on the image data read by the hardware processor.

9 Claims, 12 Drawing Sheets

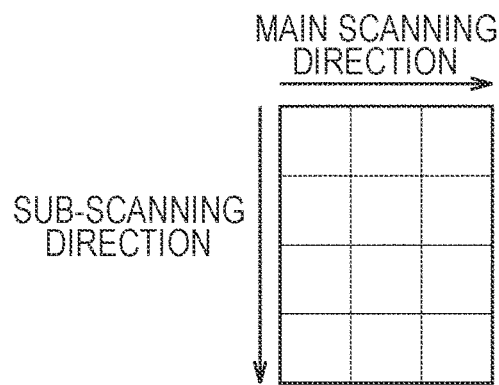
FIG. 3A1
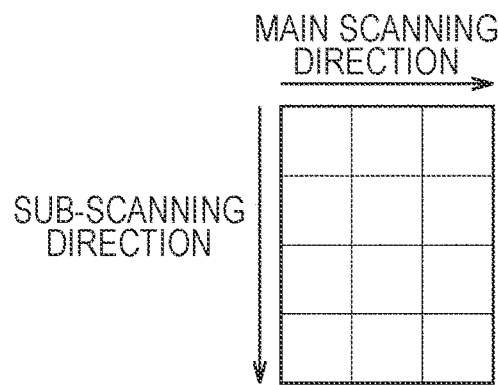
FIG. 3B1
FIG. 3B1'
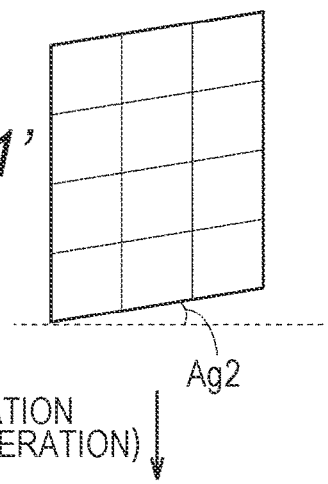
FIG. 3A2
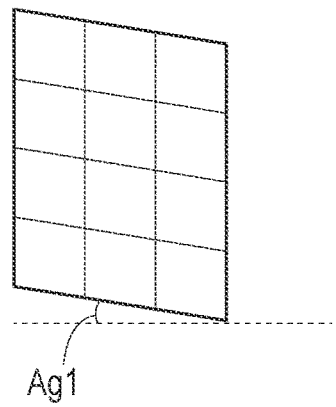
FIG. 3B2
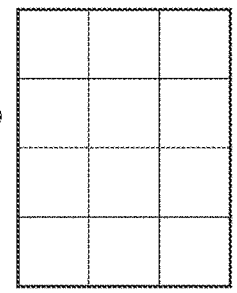

FIG. 4

| HA | 0x0 | 0x1 | 0x2 | 0x3 | 0x4 | 0x5 | 0x6 | 0x7 | 0x8 | 0x9 | 0xA | 0xB | 0xC | 0xD | 0xE | 0xF |
|---|---|---|---|---|---|---|---|---|---|---|---|---|---|---|---|---|
| VA | | | | | | | | | | | | | | | | |
| 0x00 | 100 | 101 | 102 | 103 | 104 | 105 | 106 | 107 | 108 | 109 | 10A | 10B | 10C | 10D | 10E | 10F |
| 0x10 | 110 | 111 | 112 | 113 | 114 | 115 | 116 | 117 | 118 | 119 | 11A | 11B | 11C | 11D | 11E | 11F |
| 0x20 | 120 | 121 | 122 | 123 | 124 | 125 | 126 | 127 | 128 | 129 | 12A | 12B | 12C | 12D | 12E | 12F |
| 0x30 | 130 | 131 | 132 | 133 | 134 | 135 | 136 | 137 | 138 | 139 | 13A | 13B | 13C | 13D | 13E | 13F |
| 0x40 | 140 | 141 | 142 | 143 | 144 | 145 | 146 | 147 | 148 | 149 | 14A | 14B | 14C | 14D | 14E | 14F |
| 0x50 | 150 | 151 | 152 | 153 | 154 | 155 | 156 | 157 | 158 | 159 | 15A | 15B | 15C | 15D | 15E | 15F |
| 0x60 | | | | | | | | | | | | | | | | |
| 0x70 | | | | | | | | | | | | | | | | |
| 0x80 | | | | | | | | | | | | | | | | |
| 0x90 | | | | | | | | | | | | | | | | |
| 0xA0 | | | | | | | | | | | | | | | | |
| 0xB0 | | | | | | | | | | | | | | | | |
| 0xC0 | | | | | | | | | | | | | | | | |
| CT | 0 | 0 | 0 | 0 | 0 | 0 | 0 | 0 | 0 | 0 | 0 | 0 | 0 | 0 | 0 | 0 |

FIG. 5

| HA | 0x0 | 0x1 | 0x2 | 0x3 | 0x4 | 0x5 | 0x6 | 0x7 | 0x8 | 0x9 | 0xA | 0xB | 0xC | 0xD | 0xE | 0xF |
|---|---|---|---|---|---|---|---|---|---|---|---|---|---|---|---|---|
| 0x00 | | | | | | | 100 | 101 | 102 | 103 | 104 | 105 | | | | |
| 0x10 | | | | | | | 106 | 107 | 108 | 109 | 10A | 10B | 10C | 10D | 10E | 10F |
| 0x20 | | | | | | | 116 | 117 | 118 | 119 | 11A | 11B | 11C | 11D | 11E | 11F |
| | | | | | | | | | | | | | | | | |
| 0x30 | | 131 | 132 | 133 | 134 | 135 | | | | | | | 12C | 12D | 12E | 12F |
| 0x40 | | 141 | 142 | 143 | 144 | 145 | 146 | 147 | 148 | 149 | 14A | 14B | | | | |
| 0x50 | | 151 | 152 | 153 | 154 | 155 | 156 | 157 | 158 | 159 | 15A | 15B | 15C | 15D | 15E | 15F |
| 0x60 | | | | | | | | | | | | | | | | |
| 0x70 | | | | | | | | | | | | | | | | |
| 0x80 | | | | | | | | | | | | | | | | |
| 0x90 | | | | | | | | | | | | | | | | |
| 0xA0 | | | | | | | | | | | | | | | | |
| 0xB0 | | | | | | | | | | | | | | | | |
| 0xC0 | | | | | | | | | | | | | | | | |
| CT | 0 | 0 | 0 | 0 | 0 | 0 | −1 | 0 | 0 | 0 | 0 | 0 | −1 | 0 | 0 | 0 |

FIG. 10A1
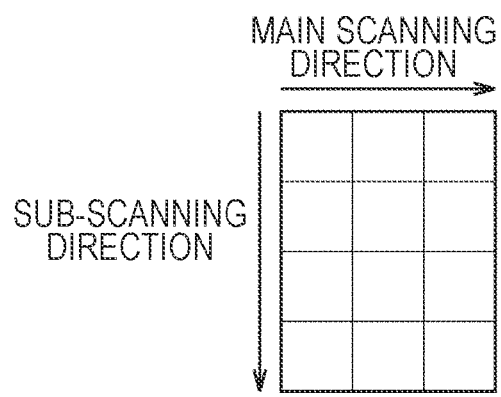
FIG. 10B1
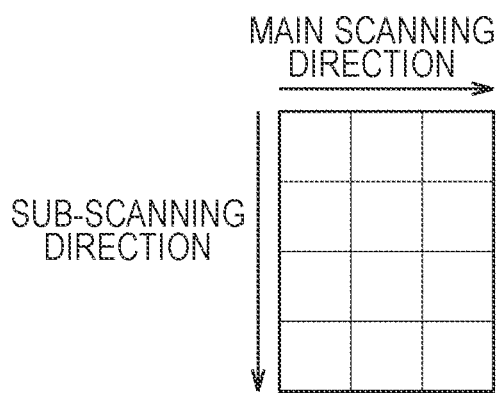
IMAGE FORMATION
(DISTORTION GENERATION)
FIG. 10B1'
IMAGE FORMATION
(DISTORTION GENERATION)
FIG. 10A2
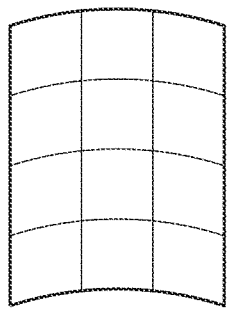
FIG. 10B2
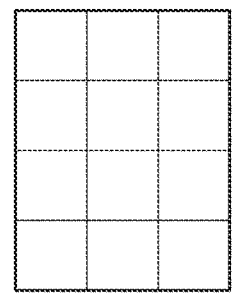

IMAGE FORMING DEVICE

The entire disclosure of Japanese patent Application No. 2020-072724, filed on Apr. 15, 2020, is incorporated herein by reference in its entirety.

BACKGROUND

Technological Field

The present disclosure relates to an image forming device.

Description of the Related Art

In recent years, there is an image forming device that performs an image forming process on a sheet after correcting image data such that an image is formed at a correct position on the sheet at the time of forming a character or an image (hereinafter referred to as the image) on the sheet, in image forming device.

The image forming device forms the image at the correct position on the sheet by correcting the image data before the image formation in a direction that cancels a positional deviation and distortion generated in the image formed on the sheet.

For example, when an image that is inclined in a sub-scanning direction is formed on a sheet due to various factors, the image forming device performs correction to transform the image such that an angle and a direction are opposite to the inclination in the sub-scanning direction at the stage of image data. Such correction is called skew correction.

In addition, when distortion occurs in the sub-scanning direction and an image having an uneven shape is formed on a sheet, the image forming device similarly corrects the image such that the image is distorted in a direction opposite to the distortion in the sub-scanning direction at the stage of the image data. Such correction is called bow correction. Skew correction and bow correction are sometimes collectively called skew and bow correction.

JP 2009-141544 A discloses a method for realizing skew and bow correction by performing correction in units of pixels or less at the stage of image data before image formation, and then, further performing correction in units of pixels and in units of blocks.

Meanwhile, JP 2009-141544 A discloses that skew and bow correction is applied to sheet-fed printing in which printing is performed on a sheet cut to a certain size called sheets of paper. However, no consideration is given to applying skew and bow correction to rotary printing in which an image for each page repeatedly printed on a continuous sheet such as roll paper.

In the rotary printing in which an image is repeatedly formed on a sheet such as roll paper, it is desirable that an image forming device prevent a margin from being generated between the images from the viewpoint of improving productivity. In other words, the generation of an unnecessary margin between images reduces the number of images that can be formed on one roll paper by the image forming device.

SUMMARY

The present disclosure has been devised in view of such circumstances, and an object thereof is to provide an image forming device that improves the productivity of an image forming process by forming images such that no margin is generated between the images formed on a sheet when the images are continuously formed after performing image correction.

To achieve the abovementioned object, according to an aspect of the present invention, there is provided an image forming device that forms images of a plurality of pages on a continuous sheet, and the image forming device reflecting one aspect of the present invention comprises: a hardware processor that: stores the images to be formed on the sheet in a page unit; writes image data to be stored to the hardware processor from the images of the plurality of pages in the hardware processor as pieces of information on a plurality of pixels arrayed in a first direction and a second direction; reads the image data written in the hardware processor; and acquires a correction amount to correct a deviation between a conveying direction of conveying the sheet to an image former and the second direction of the image data; and the image former that forms the images on the sheet based on the image data read by the hardware processor, wherein the hardware processor transforms the image data to be stored in the hardware processor based on the correction amount acquired by the hardware processor and writes the transformed image data to the hardware processor, and writes pixel information of the image data and pixel information of image data of an adjacent page on an identical line in the first direction in a part of the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 3A1 to 3B2 are schematic views illustrating a method for skew correction;

FIG. 4 is a view illustrating an example of writing image data in an image memory without performing a correction process;

FIG. 5 is a view illustrating an example of writing image data in the image memory with the skew correction;

FIG. 6 is a view illustrating an example of continuously writing the next page in the skew correction;

FIG. 9 is a view illustrating an example of writing for each block;

FIGS. 10A1 to 10B2 are schematic views illustrating a method for bow correction;

FIG. 11 is a view illustrating an example of writing image data into an image memory with the bow correction; and FIG. 12 is a view illustrating an example of continuously writing the next page in the bow correction.

DETAILED DESCRIPTION OF EMBODIMENTS

Figure 1:
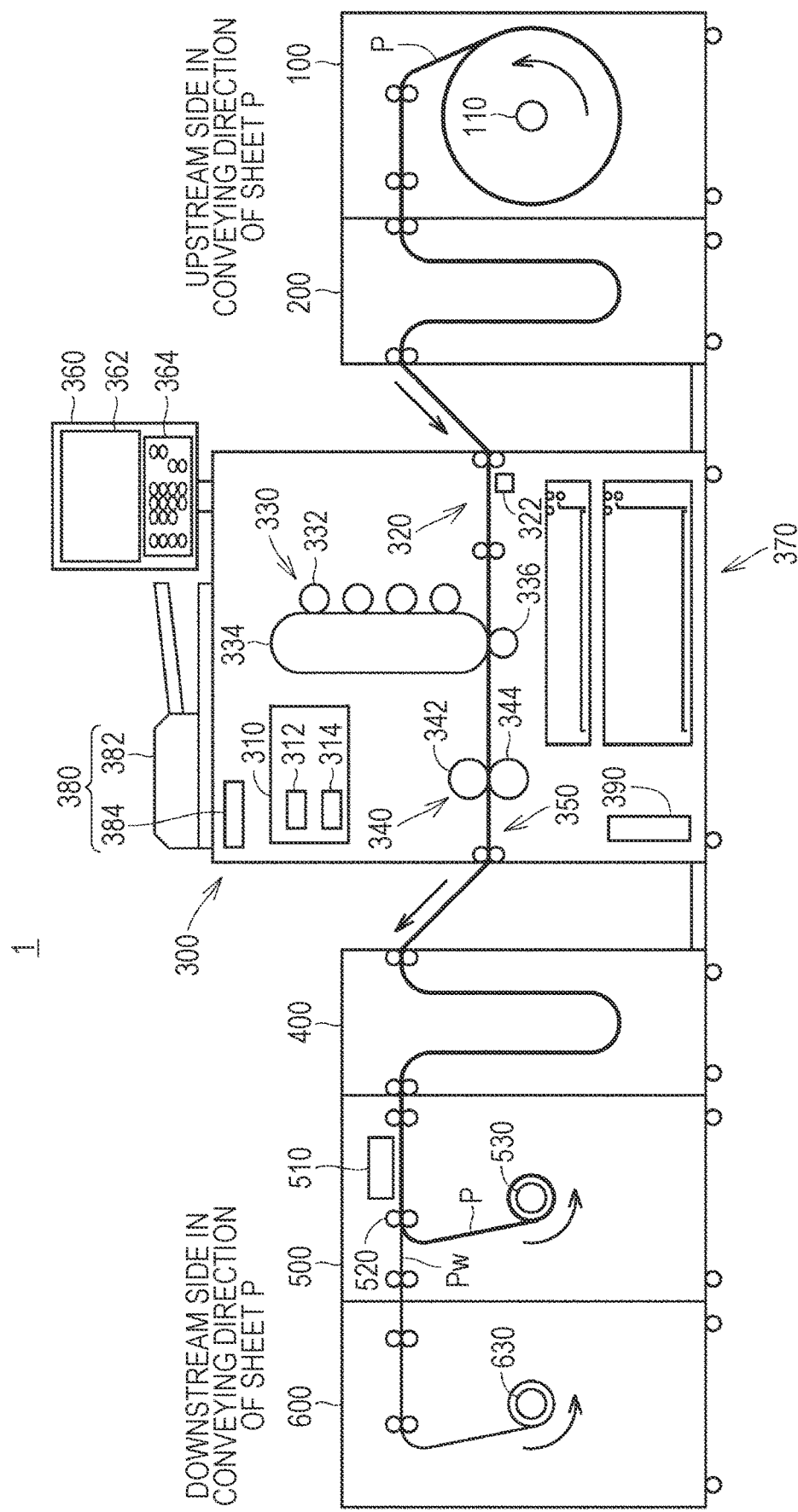
FIG. 1 is a schematic diagram for describing an image forming process according to an embodiment of the present invention.

Hereinafter, one or more embodiments of a technical concept according to the present invention will be described with reference to the drawings. However, the scope of the invention is not limited to the disclosed embodiments. In the following description, the same parts will be denoted by the same reference signs. Their names and functions are the same. Therefore, detailed descriptions thereof will not be repeated. Note that dimensional ratios in the drawings are exaggerated for convenience of the description and sometimes differ from actual ratios.

<Overall Configuration>

FIG. 1 is a schematic view for describing an image forming process according to the present embodiment.

An image forming device 300 according to the present embodiment is used to repeatedly print an image on a sheet P, which is continuous paper, at regular intervals, and is applied to, for example, an image forming system 1 illustrated in FIG. 1.

The image forming system 1 includes a paper feeding device 100, a paper feeding adjustment device 200, an image forming device 300, a paper ejecting adjustment device 400, a post-processing device 500, and a mount ejecting device 600.

In the present embodiment, the sheet P is a continuous label sheet in the form of roll paper. The sheet P is conveyed from the paper feeding device 100 to the image forming device 300 in a continuous state, and is cut into a predetermined shape by the post-processing device 500.

When the sheet P passes through the image former 330 included in the image forming device 300, a conveying direction of the sheet P is sometimes inclined with respect to a sub-scanning direction of the sheet P for the image former 330. The case of being inclined in the sub-scanning direction refers to a state of being inclined in the horizontal direction in a plane of the sheet P due to a deviation of the conveying direction of the sheet P.

When an image forming process is performed even though the continuous sheet P is inclined, an image formed on the sheet is formed in the state of being inclined on the sheet P.

In addition, when the sheet P passes through the image former 330, the sheet P is sometimes conveyed in a state of deviating from a conveyance path in the vertical direction in the plane of the sheet P. The state of deviating from the conveyance path in the vertical direction refers to a state, for example, the sheet P to be conveyed is not sufficiently pulled at both ends, and thus, is not level with the ground and is conveyed in a state where a bulge or a dent is generated on the surface of the sheet P.

That is, this refers to a state where the entire surface of the sheet P is not located on the conveyance path, and a bulging portion or the like partially deviates when the sheet P is viewed from the side. When the sheet P is conveyed in the state of deviating from the conveyance path in the vertical direction, the image formed on the sheet can be formed in a distorted state.

Therefore, the image forming device 300 of the present embodiment performs skew and bow correction the inclination and distortion generated in the sheet P by image processing. That is, the image forming device 300 acquires a correction amount to correct the inclination and distortion, and performs the skew and bow correction on image data based on the correction amount, thereby forming an appropriate image on the sheet P.

Hereinafter, each device from the paper feeding device 100 to the mount ejecting device 600 will be described along a processing flow in order to describe the entire configuration of the image forming system 1 in FIG. 1.

The paper feeding device 100 continuously feeds the sheet P to each of the subsequent device. The paper feeding device 100 includes a support shaft 110 and a plurality of rollers. The support shaft 110 is rotatably arranged and is configured to allow attachment of the roll-shaped sheet P. The sheet P attached to the support shaft 110 is conveyed to the paper feeding adjustment device 200 via the plurality of rollers.

The paper feeding adjustment device 200 adjusts the conveyance speed of the sheet P and the like. The paper feeding adjustment device 200 is located between the paper feeding device 100 and the image forming device 300. The paper feeding adjustment device 200 includes a plurality of rollers. The paper feeding adjustment device 200 continuously slackens and holds the sheet P conveyed from the paper feeding device 100, and then, conveys the sheet P to the image forming device 300.

As a result, the paper feeding adjustment device 200 absorbs a minute speed difference between the conveyance speed of the paper feeding device 100 and the conveyance speed of the image forming device 300 and a minute inclination.

The image forming device 300 repeatedly forms an image on the conveyed sheet P. The image forming device 300 includes a controller 310, a paper feeding conveyor 320, the image former 330, a fixer 340, a paper ejecting conveyor 350, an operation panel 360, a paper feeding tray 370, a document reader 380, and a communication interface 390.

The controller 310 includes a CPU 312 and a storage 314. The CPU 312 is a control circuit formed by a microprocessor or the like that controls each part and executes various arithmetic processes according to a program. Each function of the image forming device 300 is exhibited by the CPU 312 executing the corresponding program.

The storage 314 stores various programs and various types of data. The storage 314 includes a read-only memory (ROM), a random-access memory (RAM), and an image memory. The storage 314 may be configured by appropriately combining a rewritable non-volatile semiconductor memory (for example, a flash memory), a hard disk drive device, and the like.

In the image forming device 300, for example, the CPU 312 reads the program stored in the ROM as needed. The CPU 312 uses the RAM as a work area to temporarily store data required to execute the program.

The paper feeding conveyor 320 conveys the sheet P conveyed from the paper feeding adjustment device 200 to the image former 330. The paper feeding conveyor 320 includes, for example, a plurality of rollers driven by a motor.

The paper feeding conveyor 320 includes an inclination sensor 322. The inclination sensor 322 detects an inclination amount of the sheet P conveyed to the image former 330. A detection result by the inclination sensor 322 is sometimes used for skew correction.

The image former 330 forms an image on the sheet P by using an image creation process such as an electrophotographic process including charging, exposing, developing, transferring, and fixing processes. The image former 330 forms an image indicated by image data stored in the storage 314 on the sheet according to an instruction of the CPU 312.

In the image forming device 300 of the present embodiment, a mode of the image forming process is not limited to the mode using the electrophotographic process, and an impact type, a thermal transfer type, an inkjet type, or the like may be appropriately applied.

The image former 330 includes photoconductor drums 332, an intermediate transfer belt 334, and a transfer roller 336.

The photoconductor drum 332 is an image carrier having a photosensitive layer made of a resin such as polycarbonate containing an organic photo conductor (OPC). The photoconductor drum 332 is provided for each color of a yellow (Y) color, a magenta (M) color, a cyan (C) color, and a black (K) color, and is used to form an electrostatic latent image.

The intermediate transfer belt 334 transfers a toner image to the sheet P. The intermediate transfer belt 334 is a seamless endless belt. The intermediate transfer belt 334 is supported by a plurality of rollers to be capable of being driven and traveling.

Toner images of the respective colors formed by the photoconductor drums 332 are sequentially transferred onto the intermediate transfer belt 334. That is, the image former 330 forms a toner image (color image) in which layers of the respective colors (Y), (M), (C), and (K) are superimposed, on the intermediate transfer belt 334.

The transfer roller 336 transfers the toner image formed on the intermediate transfer belt 334 to the sheet P.

The image former 330 is not limited to a tandem type including the photoconductor drums 332 and the intermediate transfer belt 334, and a rotary type using a single photoconductor drum can also be applied.

The fixer 340 includes a fixing roller 342 and a pressure roller 344. The fixer 340 applies pressure and heat when the toner image transferred onto the sheet P passes between the fixing roller 342 and the pressure roller 344 (a nip portion) to melt and fix the toner image on the sheet P.

The paper ejecting conveyor 350 has, for example, a plurality of rollers driven by a motor, and conveys the sheet P conveyed from the fixer 340 to the paper ejecting adjustment device 400.

The operation panel 360 functions as a display and an input receiver. The operation panel 360 includes a display 362 and a keyboard 364.

The display 362 displays a device configuration, a print job progress status, an error occurrence status, currently changeable settings, a warning for calling user's attention, and the like. The display 362 includes a touch panel configured such that an instruction can be input according to a position of a finger or a pen that come into contact.

The keyboard 364 includes a plurality of keys formed by a selection key for specifying a sheet size, a numeric keypad for setting the number of copies, a start key for instructing the start of operation, a stop key for instructing the stop of operation, a keyboard for inputting characters, and the like.

The paper feeding tray 370 includes a plurality of paper feeding trays accommodating sheets of paper (cut paper) and a plurality of rollers used to feed the sheets of paper one by one from the paper feeding trays to a conveyance path. In this manner, in the image forming system 1 of the present embodiment, it is possible to perform the image forming process not only on the sheet P which is the continuous paper, but also on the sheets of paper.

The document reader 380 includes an automatic document feeder (ADF) 382 and a scanner 384. The scanner 384 has, for example, a charge coupled device (CCD) image sensor and is used to generate image data of a sheet to be sent from the automatic document feeder 382.

The communication interface 390 is an expansion device formed by a LAN board, and can add a communication function for executing transmission and reception of data via a network to the image forming device 300. The image forming device 300 receives, for example, a print job as data via the communication interface 390.

The network is formed by various networks such as a local area network (LAN) that connects computers and network devices according to standards such as Ethernet (registered trademark), Token Ring, and a fiber-distributed data interface (FDDI), a wide area network (WAN) that connects LANs with a dedicated line, the Internet, and combinations of these. The network protocol is, for example, transmission control protocol/Internet protocol (TCP/IP).

In the image forming system 1, when the image forming device 300 is dedicated to the image forming process on the sheet P, the paper feeding tray 370 and the document reader 380 can be omitted from the image forming device 300.

The paper ejecting adjustment device 400 adjusts the conveyance speed of the sheet P and the like. The paper ejecting adjustment device 400 is located between the image forming device 300 and the post-processing device 500. The paper ejecting adjustment device 400 includes a plurality of rollers. The paper ejecting adjustment device 400 continuously slackens and holds the sheet P conveyed from the paper feeding device 100, and then, conveys the sheet P to the post-processing device 500.

As a result, the paper ejecting adjustment device 400 absorbs a minute speed difference between the conveyance speed in the image forming device 300 and the conveyance speed in the post-processing device 500 and a minute inclination.

The post-processing device 500 performs post-processing of the sheet P on which the image has been formed. The post-processing device 500 includes a label cutter 510, a peeling roller 520, and a support shaft 530. The label cutter 510 performs post-processing to cut out the sheet at regular intervals along the image printed on the sheet P.

The label cutter 510 performs post-processing for cutting-out in synchronization with an image formation cycle in the image forming device 300. As a result, the post-processing by the label cutter 510 can be simplified in the image forming system 1.

In the image forming system 1, a mechanism for cutting out the sheet is not limited to the label cutter 510, and for example, cutting by a laser, cutting by a die, cutting by a movable blade, or the like may be appropriately applied.

The peeling roller 520 peels off an unnecessary portion Pw from the sheet P. The unnecessary portion Pw is a portion that occupies the outer circumference of a cut-out area (label side) in the sheet P. The support shaft 530 is rotatably arranged and stores the sheet P from which the unnecessary portion Pw has been peeled off.

The mount ejecting device 600 includes a support shaft 630 and a plurality of rollers. The support shaft 630 is rotatably arranged. The unnecessary portion Pw peeled off from the sheet P is stored in the support shaft 630 via the plurality of rollers.

Note that the paper ejecting adjustment device 400, the post-processing device 500, and the mount ejecting device 600 can be omitted from the image forming system 1 when the post-processing of the sheet P is additionally performed.

<Function of Executing Skew and Bow Correction Provided in Image Forming Device>

Figure 2:
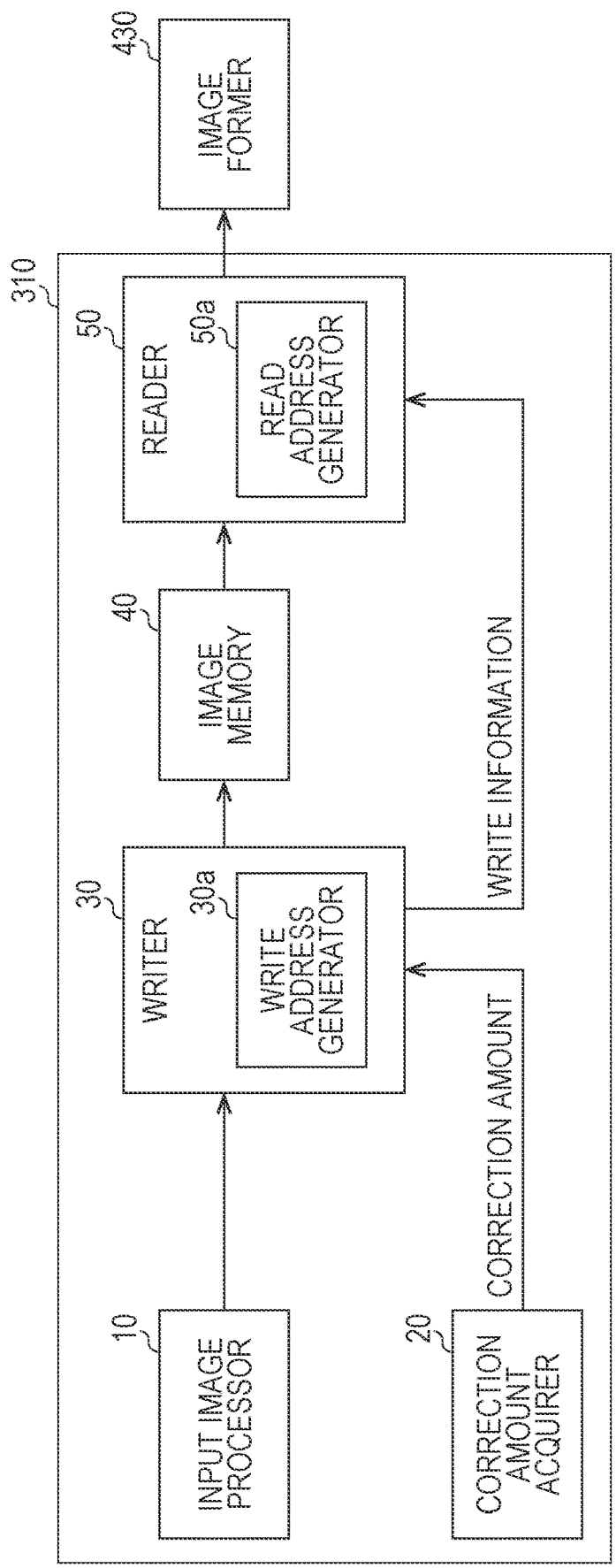
FIG. 2 is a block diagram illustrating a function of an image forming device.

The image forming device 300 has a function of executing skew and bow correction on image data formed on the sheet P. FIG. 2 is a block diagram illustrating the function of executing the skew and bow correction in the image forming device 300. The function provided in the image forming device 300 is executed by the controller 310 according to the block illustrated in FIG. 2, and the skew and bow correction is executed on the image data formed on the sheet P.

The controller 310 includes an input image processor 10, a correction amount acquirer 20, a writer 30, an image memory 40, and a reader 50.

The input image processor 10 receives the image data formed on the sheet P from an external device, the scanner 384, or the like. The input image processor 10 performs processing such as rasterization on the received image data. The input image processor 10 sends the image data that has been subjected to processing such as rasterization to the writer 30.

The correction amount acquirer 20 acquires a correction amount to perform the skew and bow correction. The correction amount indicates an amount to correct an inclination or distortion generated in a formed image.

The correction amount is a value indicating a deviation between the conveying direction in which the sheet P is conveyed to the image former 330 and the sub-scanning direction of the image data in the case of performing skew correction. That is, the correction amount is an inclination in the horizontal direction with respect to the sub-scanning direction within the plane of the sheet P.

In addition, the correction amount is a distortion amount of the formed image in the case of bow correction to be described later. The correction amount is stored in a table to be described later.

In the present embodiment, the correction amount acquirer 20 acquires the correction amount based on an angle input by a user via the operation panel 360.

A method for acquiring the correction amount based on the angle will be described later. The image forming device 300 can use the same correction amount while one print job is executed. The correction amount acquirer 20 sends the acquired correction amount to the writer 30.

The writer 30 receives the image data and the correction amount. The writer 30 transforms the image data based on the correction amount and writes the transformed image data to the image memory 40. A writing method will be described in detail later. The writer 30 includes a write address generator 30a.

The write address generator 30a generates an address in each of pixels of the image data received from the input image processor 10. The address means a virtual position on the image memory 40 that stores pixel information.

The writer 30 sends the address generated by the write address generator 30a and write information for the reader 50 to read the image data to the reader 50. The write information is information indicating the progress of writing to the image memory 40 performed by the writer 30. For example, the writer 30 sends an address of a pixel at which writing ends to the reader 50 as the write information.

The image memory 40 stores the image data written by the writer 30. The reader 50 sequentially reads the image data written in the image memory 40. The reader 50 includes a read address generator 50a. The read address generator 50a generates a read address to read image data from the image memory 40. The image former 330 forms an image on the sheet P based on the image data read by the reader 50.

<Skew Correction>

FIGS. 3A1 to 3B2 are schematic views illustrating a method for skew correction. FIGS. 3A1 and 3A2 illustrate a processing flow when the skew correction is not performed. FIGS. 3B1 and 3B1', and 3B2 illustrate a processing flow when the skew correction is performed.

FIG. 3A1 illustrates image data received from the input image processor 10 by the writer 30. The sub-scanning direction illustrated in FIG. 3A1 is the conveying direction of the sheet P. A main scanning direction illustrated in FIG. 3A1 is a direction orthogonal to the sub-scanning direction.

FIG. 3A2 illustrates an image formed on the sheet P when the image is formed without skew correction. The image illustrated in FIG. 3A2 represents an image having an inclination of the angle Ag1 formed as a result of image formation performed by the image former 330 in a state where the conveying direction of the sheet P is inclined.

Therefore, the image forming device 300 performs the skew correction by the method illustrated in FIGS. 3B1 to 3B2. FIG. 3B1 illustrates the same image data as that in FIG. 3A1.

The image forming device 300 corrects the image data in order to cancel the inclination. The image forming device 300 performs a correction process of transforming the image data illustrated in FIG. 3B1 into image data as illustrated in FIG. 3B1' having the angle Ag1 which is the inclination generated in FIG. 3A2 and an angle Ag2 which is an inclination which serves as a mirror surface. The correction process is called skew correction.

In this manner, the image forming device 300 can form an image in an appropriate shape as illustrated in FIG. 3B2 by image forming the image data that has been subjected to the skew correction on the inclined sheet P. The appropriate shape means a similar shape with the image data illustrated in FIG. 3B1, and is a rectangular shape having no inclination in FIGS. 3A1 to 3B2.

Here, returning to FIG. 2, the method for acquiring the correction amount in the correction amount acquirer 20 will be described. The user inputs the angle Ag1 indicating the inclination of the image on the sheet P illustrated in FIG. 3A2 to the image forming device 300.

For example, the image forming device 300 may be able to acquire the angle Ag1 which is the inclination of the image of FIG. 3A2 by scanning an image formed to be inclined on the sheet P and comparing the scanned image with the original image data on the display 362.

The correction amount acquirer 20 receives the angle Ag1 and acquires the correction amount to cancel the generated inclination and form the image. Specifically, the correction amount acquirer 20 calculates the angle Ag2 from the angle Ag1.

The correction amount acquirer 20 calculates a movement amount of each pixel so as to make the image data illustrated in FIG. 3B1 become the image data illustrated in FIG. 3B1' based on the angle Ag2. The correction amount acquirer 20 acquires the movement amount of each pixel as the correction amount for skew correction and holds the movement amount in the table.

<Writing to Image Memory>

FIG. 4 is a view illustrating an example of writing image data in the image memory 40 without performing the correction process. Hereinafter, a writing example without skew correction will be described in order to describe a writing method of the writer 30. That is, the image forming device 300 does not receive the angle Ag1 from the user in the example illustrated in FIG. 4.

FIG. 4 illustrates a virtual area in which an area stored in the image memory 40 is represented in two dimensions. The image memory 40 stores image data in units of pixels. A position where a pixel is stored on the virtual area can be identified from a horizontal address HA and a vertical address VA.

The horizontal address HA is an address indicating a horizontal position in the virtual area in the image memory 40. The horizontal direction in the image memory 40 is referred to as a first direction in the present embodiment.

The vertical address VA is an address indicating a vertical position in the virtual area in the image memory 40. The vertical direction in the image memory 40 is referred to as a second direction in the present embodiment.

In addition, there is a case where a description is given simply with up, down, left, and right in the drawings when describing the direction hereinafter. That is, there is a case where the second direction is referred to simply as a downward direction, a direction opposite to the second direction is referred to simply as an upward direction, the first direction is referred to simply as a right direction, and a direction opposite to the first direction is referred to simply as a left direction.

For example, a position indicated by a horizontal address HA "0x6" and a vertical address VA "0x20" is expressed as an address "0x26" in the present embodiment.

For example, a pixel "126" is stored in the address "0x26". The pixel "126" is one of pixels included in image data on a page P1.

A pixel "100" is information on a pixel at the upper left end of the image data of the page P1. The image memory 40 stores the pixel "100" as an RGB numerical value for representing the pixel at the upper left end.

A correction table CT is a table showing the correction amount acquired by the correction amount acquirer 20. As illustrated in FIG. 4, the correction table CT stores a value indicating a movement amount in the vertical direction (second direction) for each pixel arranged in the horizontal direction (first direction).

As described above, FIG. 4 illustrates the example in which the skew correction is not performed, and thus, all the numerical values stored in the correction table CT are "0".

The writer 30 performs writing for each line of pixels arrayed in the main scanning direction, starting from a pixel located at the upper leftmost end in the image data illustrated in FIG. 3A1. The main scanning direction illustrated in FIG. 3A1 corresponds to the horizontal direction (first direction) on the image memory 40, and the sub-scanning direction corresponds to the vertical direction (second direction).

The pixels arrayed in a line on a vertical address VA "0x0" are pixels arrayed in the main scanning direction at the uppermost end in the image data illustrated in FIG. 3A1.

Hereinafter, a writing order of pixels of the writer 30 will be described. The writer 30 starts writing from the pixel "100", which is the pixel at the upper left end among the pixels included in the page P1.

Thereafter, the writer 30 performs writing in the order of a pixel "101", a pixel "102", and a pixel "103". The writer 30 writes a pixel "10F" and then, writes a pixel "110". Thereafter, the writer 30 writes in the order of pixel "111", pixel "112", and pixel "113". In this manner, the writer 30 writes lines of pixels from top to bottom and writes pixels on a line from left to right.

The writer 30 ends the writing of the image data of the page P1 when writing up to the pixel "15F". That is, the page P1 includes pixels from the pixel "100" to the pixel "15F". An end line EL is a line indicating an end of the page P1.

In this manner, the writer 30 writes the image data received from the input image processor 10 to the image memory 40. The reader 50 reads the image data of the page P1 written as illustrated in FIG. 4 and sends the image data to the image former 330. The image former 330 writes the image data received from the reader 50 onto the conveyed sheet P.

<Example of Writing with Skew Correction>

FIG. 5 is a view illustrating an example of writing image data in the image memory 40 with the skew correction.

The image forming device 300 receives the angle Ag1 which is the inclination of the image formed by the user via the operation panel 360. The correction amount acquirer 20 acquires a correction amount based on the angle Ag1 and stores the correction amount in the correction table CT.

The writer 30 writes the pixels constituting the page P1 on a vertical address VA "0x20", starting from the pixel "100", which is the pixel at the upper left end, in the order of the pixel "101", the pixel "102", and the pixel "103".

The writer 30 refers to a numerical value indicating a movement amount stored in the correction table CT in order to perform the skew correction when writing each pixel.

When the numerical value that has been referred to is "+1", the writer 30 writes a corresponding pixel with a shift by one pixel in the second direction. When the numerical value that has been referred to is "0", the writer 30 writes a pixel on the same vertical address VA as a previously written pixel. When the numerical value that has been referred to is "−1", the writer 30 writes a corresponding pixel with a shift by one pixel in the direction opposite to the second direction.

When writing a pixel "106", the writer 30 refers to a corresponding numerical value from the correction table CT. The numerical value "−1" stored on the horizontal address HA "0x6" of the correction table CT corresponds to the pixel "106" located on the same horizontal address. The writer 30 refers to the numerical value "−1".

Since the numerical value that has been referred to is "−1", the writer 30 writes the pixel "106" at a pixel on a vertical address VA "0x10" shifted upward by one pixel.

Subsequently, when writing the pixel "107", the writer 30 refers to a numerical value corresponding to a horizontal address HA "0x7" of the correction table CT. Since the numerical value that has been referred to is "0", the writer 30 writes the pixel "107" on the same vertical address VA "0x10" as the pixel "106". Accordingly, the pixel "107" is written as a pixel located to the right of the pixel "106".

The writer 30 repeats the same procedure to write all the pixels included in the image data. A pixel "10C" is written to be shifted on the vertical address VA "0x00" since a corresponding numerical value of the correction table CT is "−1".

In this manner, the writer 30 writes each pixel based on the correction table CT, so that the image data having the inclination of the angle Ag2 as illustrated in FIG. 3B1' can be written in the image forming device 300.

There are six pixels from a pixel "150" to a pixel "155" which are pixels on the most second-direction side of the page P1. Since these pixels are written on a vertical address VA "0x50", the end line EL indicating the end of the page P1 is located between the vertical address VA "0x50" and a vertical address VA "0x60".

In this manner, a plurality of pixels are written to be shifted in the second direction in the image memory 40, a blank area is generated above the end line EL where the image data of the page P1 is not written.

In FIG. 5, an area indicated by an address "0x4C" to an address "0x4F" and an address "0x56" to an address "0x5F" is the blank area in which no pixel is written.

Since no pixel is written in the blank area, the image memory 40 stores initial value data while holding the data.

The writer 30 can overwrite the blank area with dummy data from an initial value in order to prevent the initial value data from being formed as an image. The dummy data is, for example, data that forms a white image.

As a result, even if an abnormality occurs in a read/write process and data in the blank area is erroneously read by the reader 50, the image forming device 300 merely forms the white image on the sheet, and it is possible to prevent the formation of an unexpected image.

In the present embodiment, however, the writer 30 writes image data of a page P2, which is the next page, to the blank area after finishing the writing of the page P1 as will be described later.

Therefore, even if the dummy data is written in the blank area, the dummy data is overwritten again at the time of writing the image data of the page P2 in the image forming device 300 of the present embodiment.

Therefore, the image forming device 300 of the present embodiment does not write the dummy data in the blank area when writing the page P1. As a result, the image forming device 300 can omit the process of writing the dummy data which is wasted by being overwritten, and can improve the performance of the image forming process and reduce the power consumption by simplifying the process.

In this manner, the writer 30 transforms the image data based on the correction table CT and writes the transformed image data to the image memory 40. As a result, it is possible to write the image data inclined in a direction that cancels the inclination illustrated in FIG. 3B1', and the image former 330 can form the appropriate image illustrated in FIG. 3B2.

<Writing of Next Page in Skew Correction>

Figure 6:
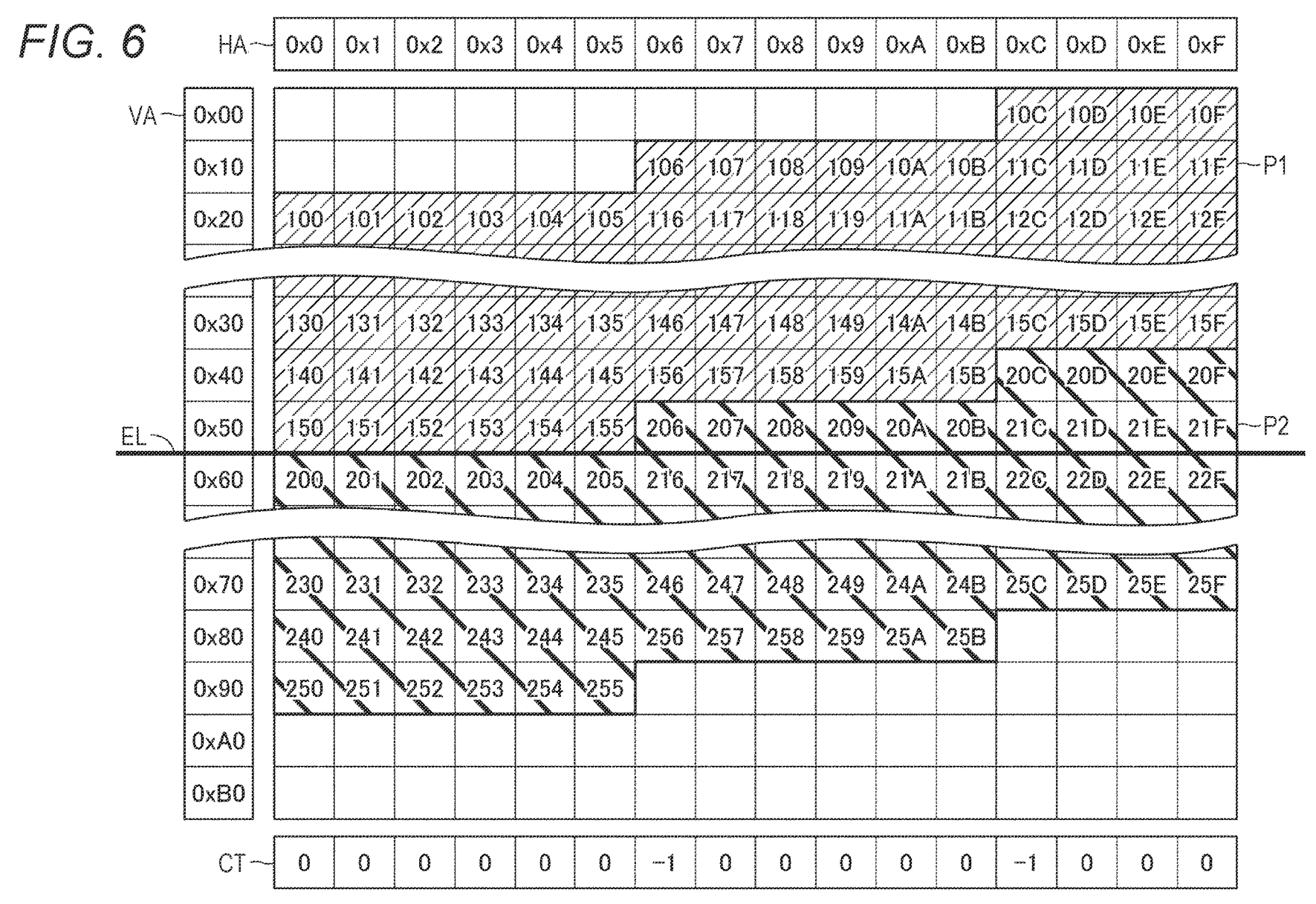

FIG. 6 is a view illustrating an example of continuously writing the next page in the skew correction. The writer 30 writes the page P2 to the image memory 40 such that there is no blank area between the image data of the page P2 and the image data of the page P1.

The image forming device 300 writes pixels of image data of adjacent pages on the same line in the first direction to prevent the generation of a blank area. The line means a plurality of pixels arrayed on the same vertical address VA.

In the present embodiment, the image forming device 300 can appropriately select three writing methods as a method for writing the page P2.

In the following, these writing methods will be described with reference to FIG. 6. The image forming device 300 may use the writing methods in combination.

(1. Method for Writing Next Page Based on Rear End Position and Correction Amount)

A method for writing the page P2 based on a rear end position of the page P1 and the correction table CT will be described hereinafter.

The writer 30 acquires the rear end position of the page P1 at the time of starting writing of the page P2. The rear end position means a pixel closest to the end line EL among the pixels included in the page P1, the pixel on a horizontal address HA "0x0".

The writer 30 acquires an address of the pixel "150" as the rear end position of the page P1.

The writer 30 writes the image data of the page P2 based on the address of the pixel "150" and the correction table CT.

The writer 30 sets an address of a pixel below the pixel "150" as a write start position of the image data of the page P2. That is, the writer 30 writes a pixel "200", which is a pixel at the upper left end of the page P2, to an address "0x60".

The writer 30 performs writing in the first direction in the order of a pixel "201", a pixel "202", and a pixel "203" while referring to the correction table CT. When writing a pixel "206", the writer 30 writes the pixel to be shifted upward by one pixel since a corresponding numerical value of the correction table CT is "−1".

The writer 30 writes the page P2 in the same procedure as the procedure for writing the page P1, and ends the write process of the page P2 by finishing writing a pixel "255".

In this manner, the image forming device 300 can write the page P2 based on the address of the pixel "150", which is the pixel that has been written for the first time among the pixels arrayed on the line in the first direction written last on the page P1, and the correction amount stored in the correction table CT while preventing a blank area from being generated between the image data of the page P1 and the image data of the page P2.

(2. Method for Writing Next Page Based on Stored Pixel Position)

The image forming device 300 can write the page P2 such that there is no blank area by a method different from the above method. The writer 30 causes the storage 314 to store addresses, which are pieces of position information of pixels on the page P1, so as to write the page P2 without creating a blank area between the image data of the page P1 and the image data of the page P2.

In FIG. 5, when writing pixels of the lowermost line of the image data received from the input image processor 10, the writer 30 causes the storage 314 to store addresses where the respective pixels have been written.

That is, the writer 30 causes the storage 314 to store the addresses where the respective pixels including the pixel "150" to the pixel "155", the pixel "156" to the pixel "15B", and the pixel "15C" to the pixel "15F" have been written.

The storage 314 stores, for example, information that the pixel "150" is written at the address "0x50".

When writing the page P2, the writer 30 refers to the pixel addresses of the page P1 stored in the storage 314.

When writing the pixel "200" located at the horizontal address HA "0x0" on the page P2, the writer 30 refers to the address of the pixel "150" which is the pixel written in the horizontal address HA "0x0" of the page P1 stored in the storage 314.

The writer 30 writes a pixel of the page P2 to be shifted downward by one pixel from the pixel of the page P1 that has been referred to.

For example, the writer 30 writes the pixel "200" on the vertical address VA "0x60" shifted downward by one pixel since the pixel "150" is written on the vertical address VA "x0".

Similarly, the writer 30 writes the pixel "201" to an address shifted downward by one pixel from the pixel "151" by referring to an address of the pixel "151". The writer 30 repeats the same procedure to write the pixel "200" to the pixel "205" onto the image memory 40.

When writing the pixel "206", the writer 30 refers to an address of the pixel "156". Since the pixel "156" is written on a vertical address VA "0x40", the writer 30 writes the pixel "206" on the vertical address VA "0x50".

The writer 30 repeats the same procedure to write pixels up to a pixel "20F". As a result, the writer 30 can write the image data of the page P2 to the image memory 40 such that there is no blank area. Accordingly, it is unnecessary for the writer 30 to refer to the correction table for the second and subsequent pages.

(3. Method for Writing Next Page Based on Area where No Pixel is Written)

The image forming device 300 can write the page P2 such that there is no blank area by a method different from the above method.

The writer 30 determines a write position of the page P2 by monitoring a blank area of the image memory 40. Returning to FIG. 5, when the writing of the image data of the page P1 has ended, the writer 30 acquires an address where the page P1 is not written in an area below an area in which the page P1 is written.

That is, the writer 30 acquires an address "0x4F" and an address "0x5F" from an address "0x4C" and an address "0x56", respectively, as blank areas. In addition, the writer 30 acquires all areas located on the second-direction side of the end line EL as blank areas.

When writing the pixel "200", the writer 30 sets an address, located on a side in the direction opposite to the most second direction in blank areas on the horizontal address HA "0x0" corresponding to the pixel "200", as a write position. That is, the writer 30 calculates that the address "0x60" is the write position of the pixel "200". As a result, the writer 30 can write the pixel "200" to the address "0x60".

Similarly, when writing the pixel "201", the writer 30 calculates the uppermost address in blank areas of a horizontal address HA "0x1" to write the pixel "201". As a result, the writer 30 can write the pixel "201" to an address "0x61". The writer 30 writes up to the pixel "205" in the same procedure.

When the writer 30 writes the pixel "206", the uppermost address in the blank area of the horizontal address HA "0x1" is located on the vertical address VA "0x50". The writer 30 writes the pixel "206" to the address "0x56".

As a result, the writer 30 can write the image data of the page P2 to fill in the image memory 40 such that there is no blank area.

Since the image forming device 300 repeatedly forms an image for each page on the sheet P, the image data can be written so that no blank area is formed among all the pages.

In this manner, the image forming device 300 of the present embodiment can write the image data of the page P2 such that there is no blank area between the image data of the page P1 and the image data of the page P2 by any of the methods described above or a combination thereof. That is, the image forming device 300 writes the pixel information included in the image data of the adjacent pages P1 and P2 on the same line in the first direction in a part of the image memory 40.

As an example of the combination, for example, the image forming device 300 calculates write addresses and collates the consistency thereof by using all the methods. If there is no consistency, the image forming device 300 assumes that a certain abnormality has occurred and displays an image indicating the abnormality on the operation panel 360.

Comparative Example

Figure 7:
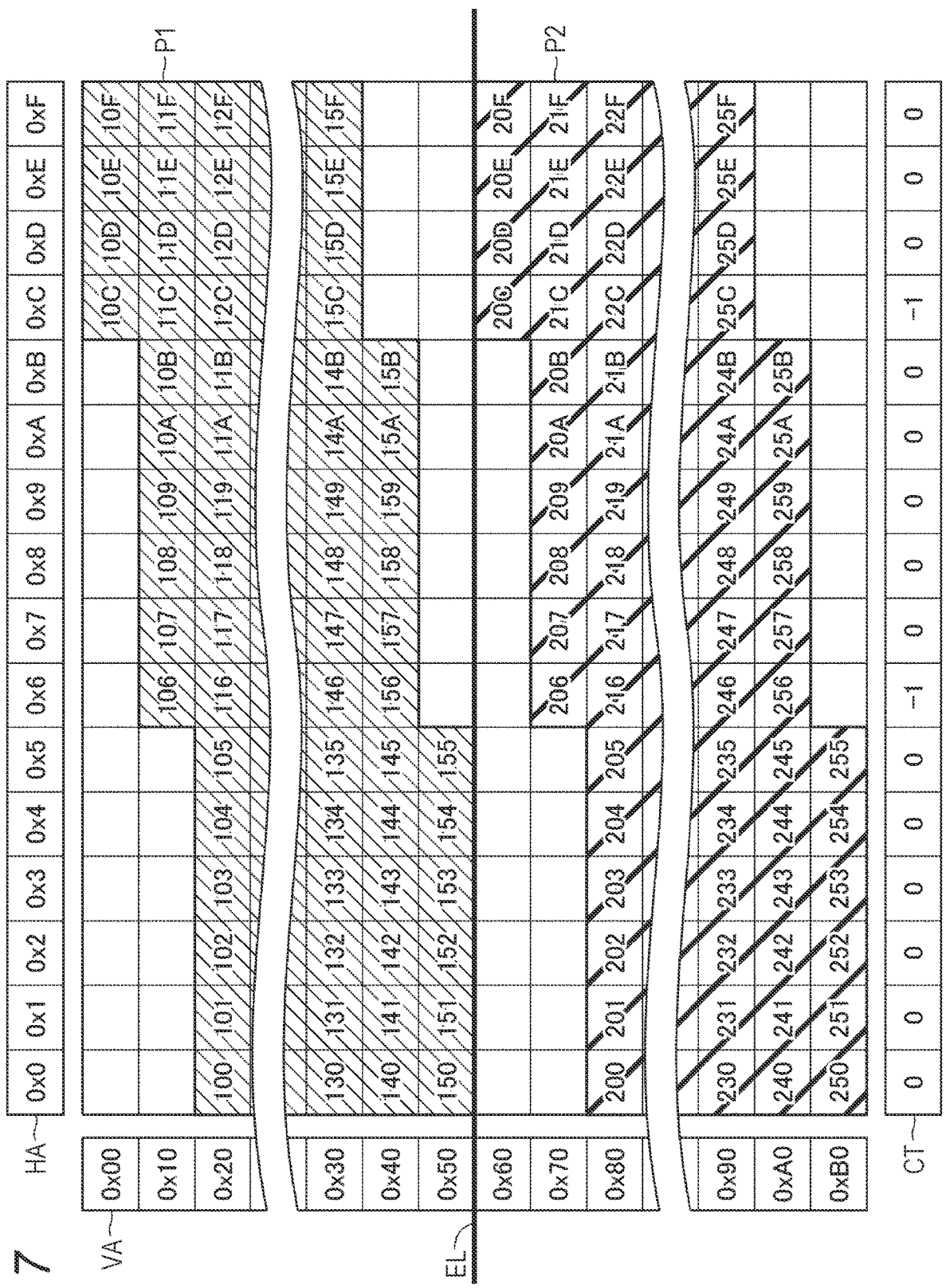
FIG. 7 is a view illustrating a comparative example in which a blank area is generated.

FIG. 7 is a diagram illustrating a comparative example in which a blank area is generated. In the comparative example, a writer 30 writes a pixel "200" of a page P2 on a vertical address VA "0x80". Therefore, in FIG. 7, a write process is ended with a blank area generated between image data of a page P1 and image data of the page P2 on an image memory 40.

<Image Formed on Sheet P>

Figure 8A:
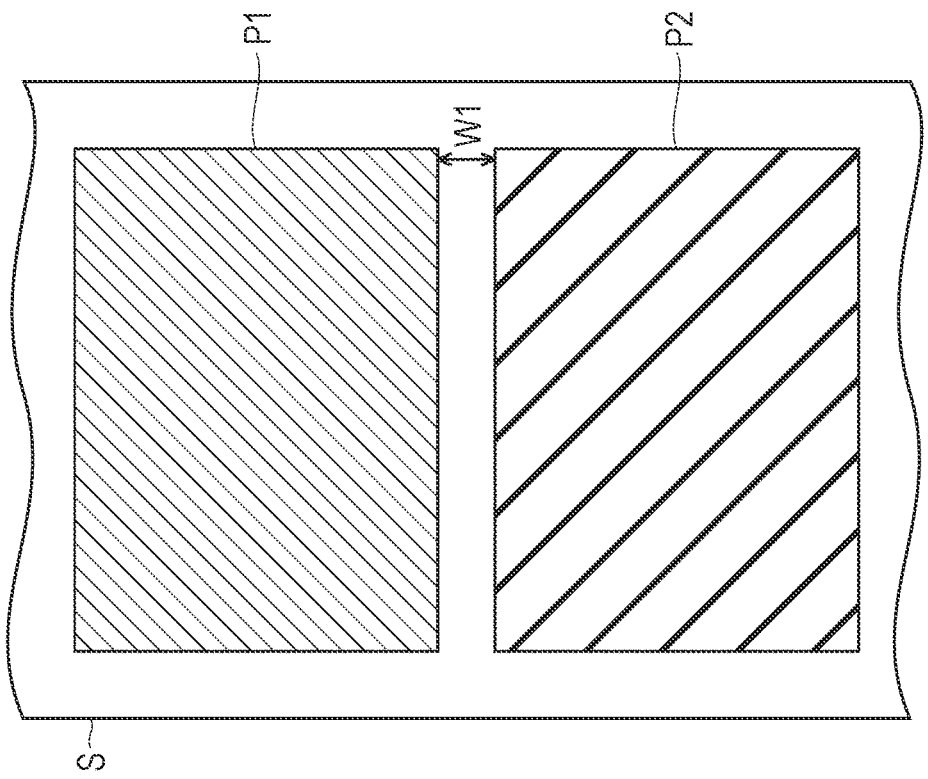
FIGS. 8A and 8B are examples of comparing images formed on sheets.
Figure 8B:
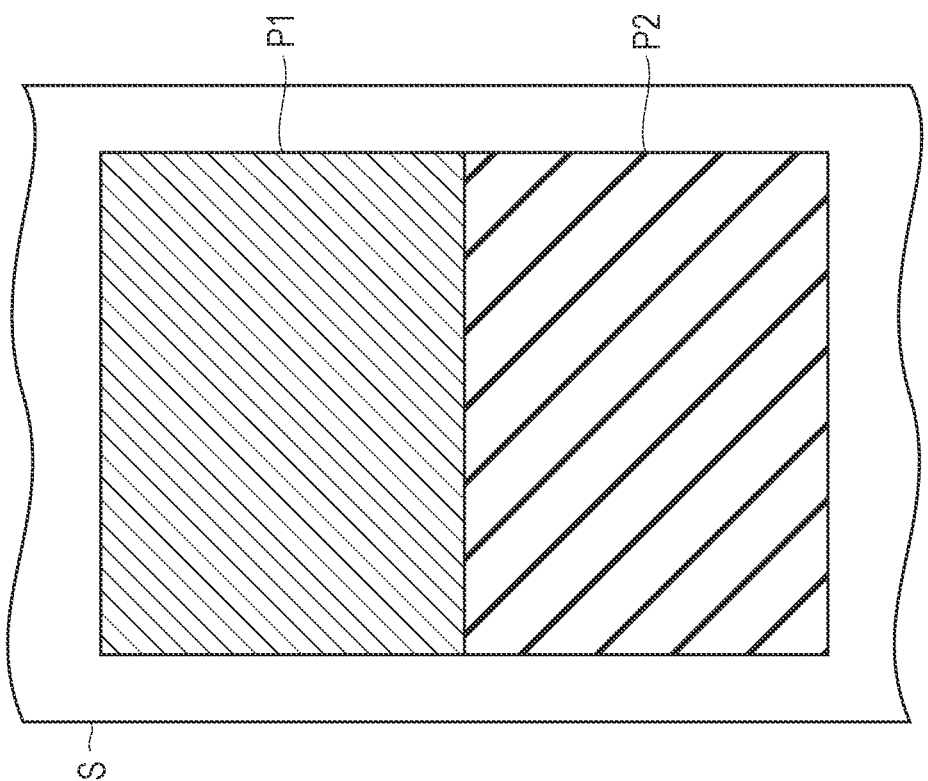

FIGS. 8A and 8B are examples of comparing images formed on the sheets P. FIG. 8A is an example of the image formed when the image forming device 300 writes image data such that there is no blank area as illustrated in FIG. 6.

FIG. 8B is an example of the image formed when the image forming device 300 writes image data while generating a blank area as illustrated in FIG. 7.

Since the image data is written such that there is no blank area in FIG. 6, no margin is generated between pages of the image formed on the sheet P. On the other hand, the blank area is generated in FIG. 7. Therefore, a margin WI is generated between pages of the image formed on the sheet P as illustrated in FIG. 8B.

In this manner, the image forming device 300 of the present embodiment writes the pixels included in the image data of the adjacent pages onto the image memory 40 to coexist in the line in the first direction, and thus, can perform the skew correction without generating the margin between the pages of the image formed on the sheet P.

As a result, the image forming device 300 can improve the productivity of the image forming process by forming the image such that no margin is generated between the images formed on the sheet P when the images are continuously formed after the image correction.

<Write for Each Block>

Figure 9:
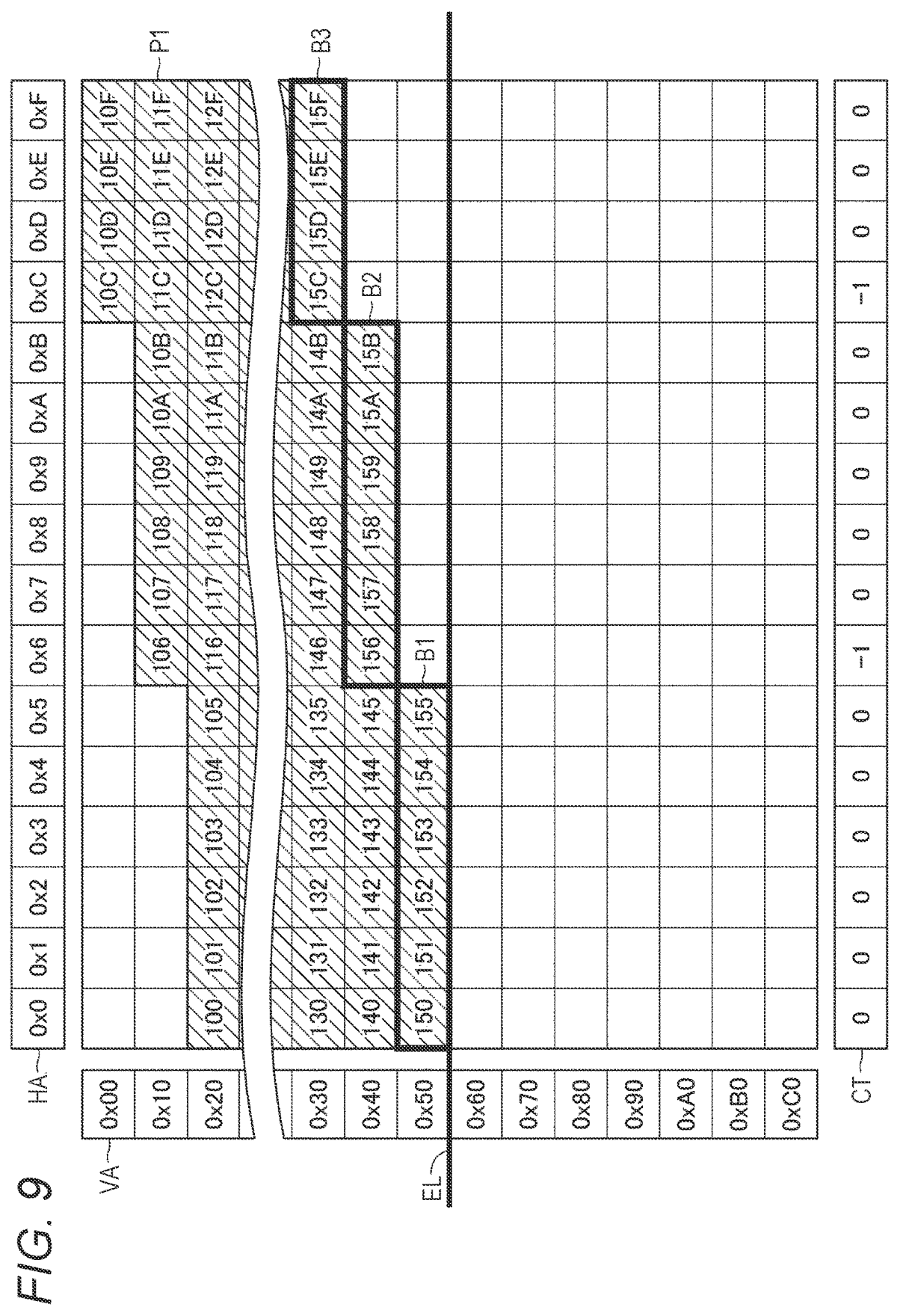

FIG. 9 is a view illustrating an example of writing for each block. As described above, the example in which the writer 30 writes the image data in the image memory 40 for each pixel has been described.

Hereinafter, an example in which the writer 30 writes image data to the image memory 40 for each block will be described.

The writer 30 calculates a unit of a block indicating the optimum group of pixels to be written to the image memory 40 by referring to the correction table CT.

As illustrated in FIG. 9, six pixels from the pixel "150" to the pixel "155" are collectively located and stored on the same vertical address on the image memory 40.

The writer 30 calculates the pixel "150" to the pixel "155" as one block B1. In addition, the writer 30 similarly calculates the pixel "156" to the pixel "15B" as one block B2. Further, the writer 30 similarly calculates the pixel "15C" to the pixel "15F" as one block B3.

The writer 30 applies the calculated blocks to all the pixels. That is, the writer 30 writes the pixel "100" to the pixel "105" collectively as the block B1.

The writer 30 writes the pixel "106" to the pixel "10B" collectively as the block B2. The writer 30 writes the pixel "10C" to the pixel "10F" collectively as the block B3.

Similarly, the writer 30 writes the other pixels to the image memory 40 in units of blocks.

As a result, when writing the image data of the page P1, the writer 30 can perform writing in the order of the block B1, the block B2, and the block B3 for each block, not for each pixel, and can improve the speed of the write process. The writer 30 can perform writing in units of blocks even in the case of the bow correction to be described later.

<Read Process>

Hereinafter, the reader 50 included in the image forming device 300 will be described. Returning to FIG. 2, the reader 50 reads the image data that has been transformed and written by the correction of the writer 30 in the image forming device 300.

The reader 50 reads each pixel stored in the image memory 40 for each line in the first direction.

For example, the reader 50 reads sixteen pixels from the pixel "100" to the pixel "10F", located on the line with the vertical address VA "0x00" in FIG. 4, at a time. Thereafter, the reader 50 reads pixels located on a line with a vertical address VA "0x01".

In FIG. 9, when reading the line of the pixels on the vertical address VA "0x00", the reader 50 reads the pixel "10C", a pixel "10D", a pixel "10E", and the pixel "10F" at once.

Subsequently, the reader 50 reads ten pixels from the pixel "106" to a pixel "11F", located on the line with the vertical address VA "0x01", at a time. The reader 50 further reads sixteen pixels from the pixel "100" to a pixel "12F", located on the line with a vertical address VA "0x02", at a time.

In this manner, the reader 50 can improve the speed of a read process by collectively reading the pixels for each line at once.

However, when the writer 30 is writing the pixels on the line to be read by the reader 50, there is a possibility that the reader 50 reads data before the writer 30 writes the data.

Therefore, the reader 50 starts reading based on the write information received from the writer 30.

As described above, the write information is information indicating the progress of writing performed by the writer 30, and is, for example, information that dynamically indicates the address of the pixel at which writing has ended. In this case, the writer 30 sends an address of a written pixel to the reader 50 each time the pixel is written.

When acquiring the write information that a pixel located on a horizontal address HA "0xF" has been written, the reader 50 starts reading pixels of a corresponding line in the first direction.

As a result, the reader 50 does not start reading the pixels of the line in the first direction even though the writer 30 has not written the image data, and is prevented from reading unexpected data.

The writer 30 may send the write information only when the pixel located on the horizontal address HA "0xF" has been written without sending the address for each pixel as the write information. Accordingly, the writer 30 can reduce the number of times of processing for transmitting the write information, and improve the speed of the write process.

<Setting to Create Margin>

As described above, the image forming device 300 of the present embodiment writes the image data such that there is no blank area, thereby preventing the margin from being generated between the pages of the formed image as illustrated in FIG. 8A.

However, there is a case where it is desired that the image forming device 300 generate a margin to form an image without completely eliminating the margin between pages depending on the user's application.

Therefore, the image forming device 300 of the present embodiment can form an image so as to generate a margin depending on the user's setting.

That is, the image forming device 300 receives margin information from the user via the operation panel 360. The margin information is a command for performing an image forming process while generating a margin, and includes margin width information.

The image forming device 300 receives, for example, information of "5 mm" as the margin width information. When the writer 30 receives the margin width information of "5 mm", the writer 30 writes image data to the image memory 40 such that a margin of 5 mm is generated between pages.

That is, the writer 30 writes the image data while generating a blank area as illustrated in FIG. 7. The writer 30 performs an overwrite process of writing dummy data that forms a white image in the blank area.

When the next page exists, the writer 30 does not overwrite the dummy data with respect to an area where a pixel of the next page is to be written. As a result, an unnecessary overwrite process can be omitted, and the writer 30 can improve the speed of the write process.

In addition, the image forming device 300 can receive, for example, information of "−5 mm" as the margin width information. When receiving the margin width information of "−5 mm", the writer 30 writes the next page by overwriting a rear end of the previous page at the time of starting to write a page.

Accordingly, when unnecessary information is included in a rear end portion of image data of the previously written page, the unnecessary information can be overwritten by overwriting the next page.

The margin information may include a setting such as generation of a margin only between pages of a predetermined image. For example, when an image forming process is performed for each number of copies, the user can make a setting to generate a margin only between the numbers of copies.

In this manner, the image forming device 300 of the present embodiment allows the user to set the presence or absence of the margin via the operation panel 360, and can flexibly respond to the user's request.

<Regarding Bow Correction>

Hereinafter, a case where the image forming device 300 performs the bow correction will be described. Items that have been already described at the time of describing the skew correction above will not be repeated. FIGS. 10A1 to 10B2 are schematic views illustrating a method for the bow correction.

As illustrated in FIGS. 10A1 to 10B2, the bow correction means to correct distortion of an image formed on the sheet P. FIG. 10A1 illustrates image data received from the input image processor 10 by the writer 30. FIG. 10A2 is the image formed on the sheet P, which has distortion.

As illustrated in FIG. 10B1', the image forming device 300 performs a correction process of transforming the image data in a direction of canceling the distortion and writing the transformed image data to the image memory 40. The correction process is called bow correction.

In this manner, the image forming device 300 can form an image with the image data that has been subjected to the bow correction in an appropriate shape as illustrated in FIG. 10B2.

In the case of performing the bow correction, the correction amount acquirer 20 receives the degree of distortion of the formed image as a correction amount. For example, the image forming device 300 scans the distorted image formed on the sheet P in a trial mode. The image forming device 300 causes the user to input a position where the distortion occurs by arranging the scanned image and the original image data side by side on the display 362 to be compared.

In addition, the controller 310 may compare the scanned image with the original image data as data and automatically calculate how much pixels included in the scanned image should be moved to transform the image into the same image as the original image data.

Further, the correction amount acquirer 20 may detect a deviation amount of the sheet P to be conveyed from the conveyance path by a distance sensor (not illustrated) and acquire the deviation amount as a correction amount. As described above, the deviation and bulge of the sheet P from the conveyance path causes the distortion in the formed image. The controller 310 may detect how much the sheet P bulges based on the deviation amount by the distance sensor and estimate the distortion of the image occurring on the sheet P.

As a result, the image forming device 300 can distort the image data in the canceling direction.

Figure 11:
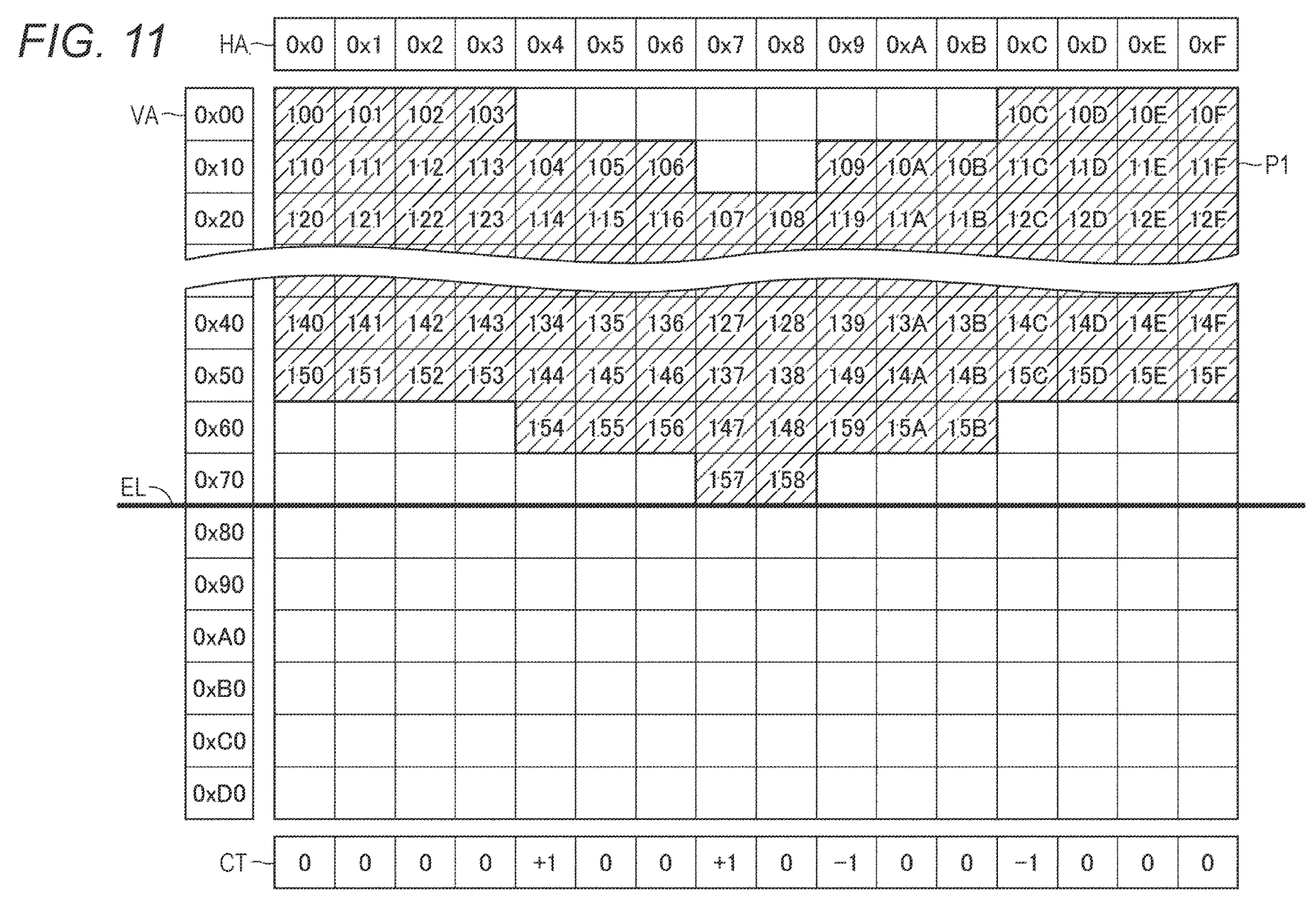

FIG. 11 is a view illustrating an example of writing image data into the image memory 40 with the bow correction. The correction amount acquirer 20 acquires the degree of distortion of the image and holds the degree of distortion in the correction table CT illustrated in FIG. 11.

The writer 30 writes the image data of the page P1 based on the correction table CT, thereby writing the image data to be distorted in the canceling direction as illustrated in FIG. 11.

As a result, the image forming device 300 can perform the bow correction as illustrated in FIG. 10B', and the image formed on the sheet P is formed as the appropriate image as illustrated in FIG. 10B2.

Figure 12:
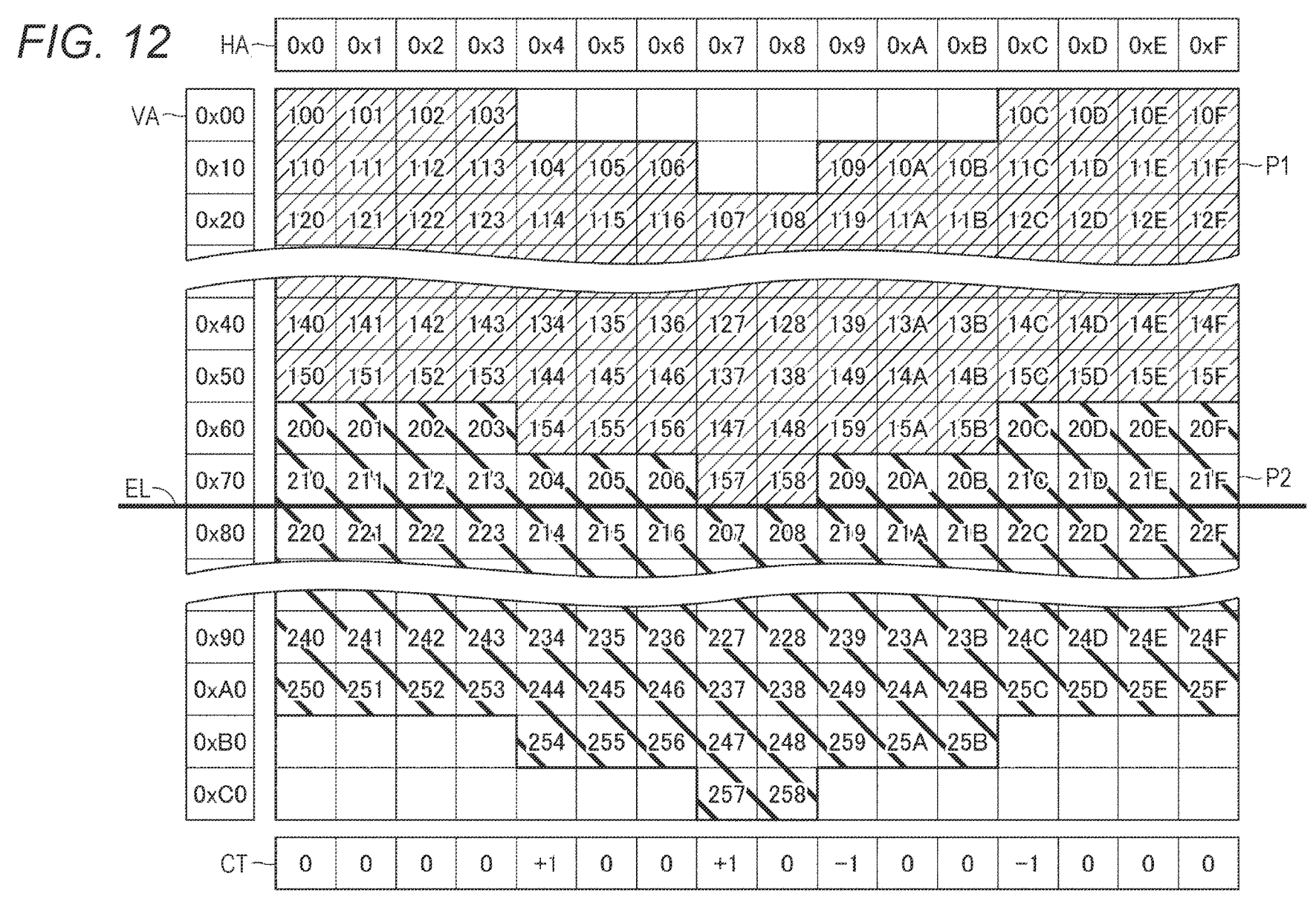

FIG. 12 is a view illustrating an example of continuously writing the next page in the bow correction. The writer 30 can perform writing such that there is no blank area even if any of the three writing methods described above is applied. In addition, the writer 30 may write the next page by combining the three writing methods.

In this manner, the image forming device 300 of the present embodiment writes the pixels included in the image data of the adjacent pages onto the image memory 40 to coexist in the line in the first direction, and thus, can perform the bow correction without generating the margin between the pages of the image formed on the sheet P.

As a result, the writer 30 can write the image data of the next page such that there is no blank area even in the case of performing not only the skew correction but also the bow correction, and can improve the productivity of the image forming process by forming the images such that no margin is generated between the images formed on the sheet P.

<Summary>

The image forming device 300 of the present embodiment is an image forming device that forms images of a plurality of pages on the continuous sheet P. The image forming device 300 includes: the image memory 40 that stores the images to be formed on the sheet P in a page unit; the writer 30 that writes image data to be stored to the image memory 40 from the images of the plurality of pages in the image memory 40 as pieces of information on a plurality of pixels arrayed in the first direction and the second direction; the reader 50 that reads the image data written in the image memory 40; the image former 330 that forms the images on the sheet based on the image data read by the reader 50; and the correction amount acquirer 20 that acquires the correction amount to correct a deviation between a conveying direction of conveying the sheet to the image former 330 and the second direction of the image data.

The writer 30 transforms the image data to be stored in the image memory 40 based on the correction amount acquired by the correction amount acquirer 20 and writes the transformed image data to the image memory 40, and writes pixel information of the image data and pixel information of image data of an adjacent page on the same line in the first direction in a part of the image memory 40.

Accordingly, the image forming device 300 forms images such that no margin is generated between the images formed on the sheet P by writing the pixel information of the image data of the adjacent pages on the same line in a part of the image memory 40 when continuously forming the images after performing image correction, thereby improving the productivity of the image forming process.

In addition, the correction amount acquired by the correction amount acquirer 20 is an inclination amount of the image data in the second direction with respect to the conveying direction of the sheet, and the writer 30 calculates a position of a pixel of the image data of a page to be written in the image memory 40 next based on a rear end position of a page written in the image memory 40 and the inclination amount.

Accordingly, the writer 30 can write the next page such that there is no blank area based on the rear end position of the previous page and the correction amount.

Further, the storage 314 that stores a position of a pixel of the image data written by the writer 30 is further provided. The writer 30 causes the storage 314 to store a position of a pixel included in the last line of a page written in the image memory 40, and writes image data of a page to be written in the image memory 40 based on the position of the pixel stored in the storage 314.

Accordingly, the writer 30 can write the next page such that there is no blank area based on the stored pixel address, regardless of the correction amount.

In addition, the writer 30 writes the pixel information of the image data of the adjacent page to fill in an area where the pixel information of the image data is not written on lines in the first direction due to the transformation of the image data.

Accordingly, the writer 30 can write the image data of the next page based on the blank area which is the area where the pixel information of the image data is not written.

Further, the reader 50 receives write information indicating the progress of writing from the writer 30, and determines whether or not pixel information has been written in all lines based on the write information for the lines in the first direction of the image memory 40, and reads the pixel information written in the lines after determining that the pixel information has been written in all the lines.

Accordingly, the reader 50 can perform the read process while preventing reading of the data before being written by the writer 30.

In addition, the writer 30 calculates a block unit to collectively write the pieces of information of the plurality of pixels, arrayed in the first direction of the image memory 40, based on the correction amount, and writes the image data in the image memory 40 in the calculated block unit.

Accordingly, the writer 30 can collectively write the pixels in the block unit, and the speed and performance of the write process are improved.

Further, the reader 50 reads the image data for each line in the first direction of the image memory 40.

Accordingly, the reader 50 can collectively read the image data for each line in the first direction, and the speed and performance of the reading process are improved.

In addition, the operation panel 360 that receives an input from a user is further provided. The operation panel 360 receives a width indicating a margin between pages of images to be formed on the sheet P, and the writer 30 writes the image data in the image memory 40 based on the width received from the operation panel 360.

Accordingly, the image forming device 300 can adjust the margin depending on the user's setting, and can flexibly respond to the user's request.

Further, the writer 30 performs an overwrite process of overwriting and storing dummy data at a position where a pixel of a page is not stored in the image memory 40 when writing of the page is ended, and starts writing of a next page without performing the overwrite process when the next page of the page exists.

Accordingly, even when the image forming device 300 receives margin information and writes the dummy data, the process of writing unnecessary dummy data can be omitted, and the speed and performance of the write process are improved.

Although embodiments of the present invention have been described and illustrated in detail, the disclosed embodiments are made for purposes of illustration and example only and not limitation. The scope of the present invention should be interpreted not by terms of the above description but by terms of the appended claims, and is intended to include all modifications within the meaning and scope equivalent to the scope of claims.

What is claimed is:

1. An image forming device that forms images of a plurality of pages on a continuous sheet, the image forming device comprising:
    a hardware processor that:
        stores the images to be formed on the sheet in a page unit;
        writes image data to be stored to the hardware processor from the images of the plurality of pages in the hardware processor as pieces of information on a plurality of pixels arrayed in a first direction and a second direction;
        reads the image data written in the hardware processor, and
        acquires a correction amount to correct a deviation between a conveying direction of conveying the sheet to an image former and the second direction of the image data; and
    the image former that forms the images on the sheet based on the image data read by the hardware processor, wherein
    the hardware processor
    transforms the image data to be stored in the hardware processor based on the correction amount acquired by the hardware processor and writes the transformed image data to the hardware processor, and
    writes pixel information of the image data and pixel information of image data of an adjacent page on an identical line in the first direction in a part of the hardware processor.

2. The image forming device according to claim 1, wherein
    the correction amount acquired by the hardware processor is an inclination amount of the image data in the second direction with respect to the conveying direction of the sheet, and
    the hardware processor calculates a position of a pixel of the image data of a page to be written in the hardware processor next based on a rear end position of a page written in the hardware processor and the inclination amount.

3. The image forming device according to claim 1, wherein
    the hardware processor stores a position of a pixel of the image data written by the hardware processor, and
    the hardware processor
    stores a position of a pixel included in a last line of a page written in the hardware processor, and
    writes image data of a page to be written next in the hardware processor based on the position of the pixel stored in the hardware processor.

4. The image forming device according to claim 1, wherein
    the hardware processor continuously writes the pixel information of the image data of the adjacent page to fill in an area where the pixel information of the image data is not written on lines in the first direction due to the transformation of the image data.

5. The image forming device according to claim 1, wherein
    the hardware processor
    receives write information indicating a progress of writing from the hardware processor, and
    determines whether or not pixel information has been written in all lines based on the write information for the lines in the first direction of the hardware processor, and reads the pixel information written in the lines after determining that the pixel information has been written in all the lines.

6. The image forming device according to claim 1, wherein
    the hardware processor
    calculates a block unit to collectively write the pieces of information of the plurality of pixels, arrayed in the first direction of the hardware processor, based on the correction amount, and
    writes the image data in the hardware processor in the calculated block unit.

7. The image forming device according to claim 1, wherein
    the hardware processor reads the image data for each line in the first direction of the hardware processor.

8. The image forming device according to claim 1, further comprising
    an input receiver that receives an input from a user, wherein
    the input receiver receives a width indicating a margin between pages of images to be formed on the sheet, and
    the hardware processor writes the image data in the hardware processor based on the width received from the input receiver.

9. The image forming device according to claim 1, wherein
    the hardware processor
    performs an overwrite process of overwriting and storing predetermined data at a position where a pixel of a page is not stored in the hardware processor when writing of the page is ended, and
    starts writing of a next page without performing the overwrite process when the next page of the page exists.

* * * * *